United States Patent
Wang et al.

(10) Patent No.: US 11,186,655 B2
(45) Date of Patent: Nov. 30, 2021

(54) OFF-LINE FILTER FREE ZIEGLER-NATTA CATALYST PREPARATION

(71) Applicant: NOVA Chemicals (International) S.A., Fribourg (CH)

(72) Inventors: Qinyan Wang, Calgary (CA); Holly Kalma, Fort McMurray (CA); Marissa Clapson, Calgary (CA); Peter Zoricak, Calgary (CA); Lawrence VanAsseldonk, Sarnia (CA); Stephen Brown, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 250 days.

(21) Appl. No.: 16/426,324

(22) Filed: May 30, 2019

(65) Prior Publication Data
US 2019/0375862 A1 Dec. 12, 2019

(30) Foreign Application Priority Data
Jun. 6, 2018 (CA) .................. CA 3007381

(51) Int. Cl.
| | |
|---|---|
| C08F 4/642 | (2006.01) |
| C08F 4/654 | (2006.01) |
| C08F 2/04 | (2006.01) |
| C08F 4/52 | (2006.01) |
| C08F 4/02 | (2006.01) |
| C08F 2/06 | (2006.01) |
| C08F 210/16 | (2006.01) |
| C08F 2/01 | (2006.01) |
| B01J 31/22 | (2006.01) |

(52) U.S. Cl.
CPC ......... *C08F 4/6421* (2013.01); *B01J 31/2204* (2013.01); *C08F 2/01* (2013.01); *C08F 2/06* (2013.01); *C08F 4/022* (2013.01); *C08F 4/6546* (2013.01); *C08F 210/16* (2013.01); *B01J 2231/122* (2013.01); *B01J 2531/46* (2013.01)

(58) Field of Classification Search
CPC ...... C08F 4/6421; C08F 4/022; C08F 4/6546; C08F 10/00; C08F 2/06
See application file for complete search history.

(56) References Cited

U.S. PATENT DOCUMENTS

| | | | |
|---|---|---|---|
| 4,250,288 A | 2/1981 | Lowery, Jr. et al. | |
| 4,302,566 A | 11/1981 | Karol et al. | |
| 4,601,994 A | 7/1986 | Coleman, III | |
| 5,519,098 A * | 5/1996 | Brown | C08F 10/02 502/113 |
| 6,024,483 A * | 2/2000 | Burke | B01F 7/00208 366/295 |
| 6,339,036 B1 * | 1/2002 | Jaber | B01J 31/122 502/104 |
| 6,713,189 B2 * | 3/2004 | Ho | C08J 5/18 428/523 |
| 6,723,677 B1 * | 4/2004 | Estrada | C08F 10/00 502/103 |
| 6,723,809 B1 | 4/2004 | Menconi et al. | |
| 6,730,627 B1 | 5/2004 | Masi et al. | |
| 7,666,810 B2 * | 2/2010 | Wang | C08F 210/16 502/115 |
| 8,101,693 B2 * | 1/2012 | Van Asseldonk | C08F 210/16 526/64 |
| 8,907,029 B2 * | 12/2014 | Wang | C08F 10/00 526/123.1 |
| 9,481,748 B2 * | 11/2016 | Wang | C08F 210/16 |
| 9,963,526 B2 * | 5/2018 | Wang | C08F 210/16 |
| 10,647,588 B2 * | 5/2020 | Zoricak | B01J 21/063 |
| 2019/0127496 A1 * | 5/2019 | Brown | C08F 10/00 |

FOREIGN PATENT DOCUMENTS

| | | |
|---|---|---|
| CA | 2119737 | 3/2003 |
| WO | 93/07188 A1 | 4/1993 |

\* cited by examiner

*Primary Examiner* — Rip A Lee
(74) *Attorney, Agent, or Firm* — Thomas J. Styslinger

(57) ABSTRACT

The various embodiments provide, a magnesium titanium polymerization procatalyst, and methods for making and using the same.

15 Claims, No Drawings

OFF-LINE FILTER FREE ZIEGLER-NATTA CATALYST PREPARATION

Magnesium-titanium catalysts for olefin polymerization are in wide commercial use. In general, these catalysts comprise a magnesium halide component (typically, magnesium dichloride) and a titanium component that is deposited on the magnesium dichloride.

The resulting magnesium-titanium complex is often referred to as a "procatalyst" because it requires a co-catalyst or an activator to produce a highly reactive polymerization catalyst system.

The procatalyst may be first synthesized then added to the polymerization reactor at a later time. Alternately, the procatalyst may be prepared by an 'in-line mixing technique' (adjacent to a polymerization reactor) and added directly to the reactor.

Many of the original Ziegler-Natta catalysts are not sufficiently active to permit the catalyst residues to be left in the polymer without causing quality problems (such as polymer color and a propensity to degrade/oxidize the polymer in an undesirably short time period). Accordingly, there is a need for "high activity leave-in" catalysts, which are characterized by having less problematic catalyst residues that may be left in the finished polymer.

A need exists for a highly active magnesium-titanium catalyst for use in high temperature solution polymerizations generating polyolefins that can provide increased comonomer incorporation and higher molecular weight polymeric materials with lower residual titanium and halogen impurities. However, there is often a challenge to scaling up catalysts to commercial volumes when there is a need for filtration at the final stage of preparation and/or at any other stages leading to the final catalyst preparation. Disclosed herein, in some embodiments, are filter-free catalysts that perform as well as catalysts similarly prepared but including one or more washing and filtration steps.

Some embodiments herein provide a procatalyst for polymerization of ethylene and α-olefins on a delta form $MgCl_2$ support comprising a $Ti^{3+}$ complex of the formula $TiCl_3*[[R^4]_a[R^5O]_bAlX_{3-c}]_d$ where a is 0 to 1; b is 0 to 1; c=a+b; d is from about 0.33 to about 1.0; each $R^4$ and $R^5$ is independently chosen from $C_{1-8}$ alkyl; each X is independently chosen from the halogen radicals; and further wherein at least 60% of the total Ti present is in the $Ti^{3+}$ oxidation state.

Other embodiments herein provide a process to prepare an olefin polymerization procatalyst comprising a $Ti^{3+}$ complex, said process comprising: a) forming a delta form $MgCl_2$ species by combining i) a Mg compound chosen from butylethyl magnesium (BEM), dibutyl magnesium, and butyloctyl magnesium (BOM), in a solvent chosen from $C_{5-12}$ alkanes, or mixtures thereof, ii) reactive organic chloride or HCl; and wherein the mole ratio of added Cl and Mg is from 2.1 to 2.3; b) adding to said delta form $MgCl_2$ species prepared in step a), an aluminum alkyl halide of the formula $R^1_xAlX_{3-x}$ first, a tetravalent titanium compound second, followed by an alkyl aluminum alkoxide of the formula $R^4_yAlOR^5_{3-y}$, wherein the Al/Ti molar ratio when measuring Al supplied from $R^1_xAlX_{3-x}$ only is from about 0.7 to about 1 and the Al/Ti molar ratio when measuring Al supplied from $R^4_yAlOR^5_{3-y}$ is from about 1 to about 2; and further wherein the Mg/Ti molar ratio is from about 5 to about 10; x is 1 or 2; y is 1 or 2; each $R^1$ is independently chosen from $C_{1-8}$ alkyl radicals; the tetravalent titanium compound is chosen from $TiR^2X_3$, $Ti(OR^3)X_3$, $TiX_4$, and mixtures thereof; each X is independently chosen from the halogen radicals; and each $R^2$ is independently chosen from $C_{1-8}$ alkyl radicals and benzyl, each $R^3$, $R^4$ and $R^5$ are independently chosen from $C_{1-8}$ alkyl radicals; wherein no filtration or washing steps are performed during or after the formation of the catalyst.

Other embodiments herein provide a solution olefin polymerization process comprising i) adding to one or more continuous stirred tank reactor (CSTR), optionally followed by a tubular reactor, either in series or parallel, a solvent chosen from $C_{5-12}$ alkanes, or mixtures thereof, and a procatalyst for polymerization on a delta form $MgCl_2$ support comprising a $Ti^{3+}$ complex of the formula $TiCl_3*[[R^4]_a[R^5O]_bAlX_{3-c}]_d$ wherein a is 0 to 1; b is 0 to 1; c=a+b; d is from 0.33 to 1.0; each $R^4$ and $R^5$ is independently chosen from $C_{1-8}$ alkyl radicals; each X is independently chosen from the halogen radicals; wherein at least 60% of the total Ti present is in the $Ti^{3+}$ oxidation state; and further wherein no filtration or washing step is performed on the as formed procatalyst prior to the remaining steps; ii) adding ethylene, hydrogen and optionally one or more comonomers chosen from $C_{3-8}$ comonomers to the reactor; and iii) adding an aluminum alkyl activator to the reactor in a molar ratio of about 1 to about 10 relative to the amount of procatalyst.

Other embodiments herein provide an olefin polymerization product prepared by a polymerization process comprising i) adding to a continuous stirred tank reactor (CSTR) optionally with one or more additional reactors, a solvent chosen from $C_{5-12}$ alkanes and a procatalyst for polymerization on a delta form $MgCl_2$ support comprising a $Ti^{3+}$ complex of the formula $TiCl_3*[[R^4]_a[R^5O]_bAlX_{3-c}]_d$ wherein a is 0 to 1; b is 0 to 1; c=a+b; d is from 0.33 to 1.0; each $R^4$ and $R^5$ is independently chosen from $C_{1-8}$ alkyl radicals; each X is independently chosen from the halogen radicals; wherein at least 60% of the total Ti present is in the $Ti^{3+}$ oxidation state; ii) adding ethylene, hydrogen and optionally one or more comonomers chosen from $C_{3-8}$ comonomers to the reactor; and iii) adding an aluminum alkyl activator to the reactor in a molar ratio of about 1 to about 10 relative to the amount of procatalyst.

Other embodiments herein provide a plastic article chosen from films, fibers, molded or thermoformed articles, and pipe coatings comprising an olefin polymerization product prepared by a polymerization process comprising i) adding to a continuous stirred tank reactor (CSTR) optionally with one or more additional reactors, a solvent chosen from $C_{5-12}$ alkanes and a procatalyst for polymerization on a delta form $MgCl_2$ support comprising a $Ti^{3+}$ complex of the formula $TiCl_3*[[R^4]_a[R^5O]_bAlX_{3-c}]_d$ where a is 0 to 1; b is 0 to 1; c=a+b; d is from 0.33 to 1.0; each $R^4$ and $R^5$ is independently chosen from $C_{1-8}$ alkyl radicals; each X is independently chosen from the halogen radicals; wherein at least 60% of the total Ti present is in the $Ti^{3+}$ oxidation state; ii) adding ethylene, hydrogen and optionally one or more comonomers chosen from $C_{3-8}$ comonomers to the reactor; and iii) adding an aluminum alkyl activator to the reactor in a molar ratio of about 1 to about 10 relative to the amount of procatalyst.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

It must be noted that as used herein, and in the appended claims, the singular forms "a," "an," and "the" include plural references unless the context clearly dictates otherwise.

Unless defined otherwise, all technical, and scientific terms used herein have the same meanings as commonly understood by one of ordinary skill in the art to which this invention belongs.

The terms "alkyl" "alkyl group" and "alkyl radical" can be used interchangeably and refer to saturated monovalent straight or branched chain and cyclic hydrocarbyl groups or radicals bonded to one or more other moieties. For example, the alkyl could be bonded to an oxygen atom to form an alkoxy group, or to a metal as part of or as the ligand on that metal. The term "alkyl" is exemplified by groups such as methyl, ethyl, n-propyl, iso-propyl, n-butyl, t-butyl, n-pentyl, adamantyl, cyclopropyl, cyclobutyl, cyclopentyl, cyclohexyl, cyclooctyl, and the like.

The term "alkanes" refers to non-aromatic, saturated hydrocarbon molecules with the general formula $C_nH_{(2n+2)}$, wherein n is an integer. Alkanes, for example, may be used as solvents or gas feeds.

When a term is preceded by $C_{x-y}$ where x and y are integers, the group is limited to from x to y carbon atoms within the group, excluding any substituents referred to as substituting groups. For example, the $C_{1-5}$ alkyl radicals would include (but not be limited to) methyl, iso-propyl, n-butyl, t-butyl, cyclopropyl, and cyclopentyl radicals, where $C_{1-5}$ alkane would include (but not be limited to) methane, ethane, pentane, cyclopentane, and the like.

The term "halogen radical" or "halogen" or "halo" can be used interchangeably and refer to fluoride, chloride, bromide or iodide groups.

The Procatalyst

In one embodiment, described herein is a procatalyst for polymerization of ethylene and α-olefins on a delta form $MgCl_2$ support comprising a $Ti^{3+}$ complex of the formula $TiCl_3*[[R^4]_a[R^5O]_bAlX_{3-c}]_d$ wherein a is 0 to 1; b is 0 to 1; c=a+b; d is from 0.33 to 1.0; each $R^4$ and $R^5$ is independently chosen from $C_{1-8}$ alkyl radicals; each X is independently chosen from the halogen radicals; and wherein at least 60% of the total Ti present is in the $Ti^{3+}$ oxidation state.

While X can be any halogen, in some embodiments X is Br or Cl. In other embodiments X is Cl.

In some embodiments c is 0. In other embodiments c is 1.

In some embodiments a is 0 and b is 1. In some embodiments a is 1 and b is 0. In some embodiments a is 1 and b is 1. In some embodiments a is 0 and b is 0.

In some embodiments each $R^5$ is $C_{1-4}$alkyl. In other embodiments, each $R^5$ is ethyl.

In some embodiments each $R^4$ is $C_{1-4}$ alkyl. In other embodiments, each $R^4$ is ethyl.

Magnesium/Titanium Mole Ratio

It will be recognized by those skilled in the art of magnesium-titanium polymerization catalysts that the catalyst activity can be influenced by the magnesium/titanium mole ratio. Example Mg/Ti mole ratios are from 5/1 to 10/1 for the catalysts disclosed herein, for example from 5 to 10 moles of Mg are present per mole of Ti in the catalyst.

In some embodiments, the Mg/Ti molar ratio is from about 5 to about 8. In other embodiments, the Mg/Ti ratio is from about 6 to about 8. The desired Mg/Ti molar ratio can be obtained by preparing the procatalyst according to the methods described herein. The procatalyst formula and ratio of elements contained therein can be determined using standard elemental analysis techniques including but not limited to classical "wet chemistry," neutron activation, Inductively Coupled Plasma-Mass Spectrometry (ICP-MS).

Catalyst samples can be analyzed for titanium valence distribution using the redox titration method for titanium valence distribution (see J. C. W. Chien et. al, *J. Polym. Sci. Part A: Polym Chem.* 1989, 27, 1499-1514) or using an ultraviolet (UV) method for titanium content analysis based on ASTM standard E878-01.

In some embodiments at least 70% of the total Ti present is in the $Ti^{3+}$ oxidation state. In other embodiments at least 80% of the total Ti present is in the $Ti^{3+}$ oxidation state.

In one embodiment the procatalyst is a $Ti^{3+}$ complex of the formula $TiCl_3*[OEtAlCl_2]_d$, and the Mg/Ti molar ratio is from about 5 to about 8. In some embodiments, partially alkylated versions of $TiCl_3*[OEtAlCl_2]_2$ may be present.

Another embodiment described herein provides a process to prepare an olefin polymerization procatalyst comprising a $Ti^{3+}$ complex, said process comprising: a) forming a delta form $MgCl_2$ species by combining i) a Mg compound chosen from butylethyl magnesium (BEM), dibutyl magnesium, and butyloctyl magnesium (BOM), in a solvent chosen from $C_{5-12}$ alkanes, or mixtures thereof, ii) reactive organic chloride or HCl; and wherein the mole ratio of added Cl and Mg is from 2.1 to 2.3; b) adding to said delta form $MgCl_2$ species prepared in step a), an aluminum alkyl halide of the formula $R^1_xAlX_{3-x}$ first, a tetravalent titanium compound second, followed by an alkyl aluminum alkoxide of the formula $R^4_yAlOR^5_{3-y}$, wherein the Al/Ti molar ratio when measuring Al supplied from $R^1_xAlX_{3-x}$ only is from about 0.7 to about 1 and the Al/Ti molar ratio when measuring Al supplied from $R^4_yAlOR^5_{3-y}$ is from about 1 to about 2; and further wherein the Mg/Ti molar ratio is from about 5 to about 10; x is 1 or 2; y is 1 or 2; each $R^1$ is independently chosen from $C_{1-8}$ alkyl radicals; the tetravalent titanium compound is chosen from $TiR^2X_3$, $Ti(OR^3)X_3$, $TiX_4$, and mixtures thereof; each X is independently chosen from the halogen radicals; and each $R^2$ is independently chosen from $C_{1-8}$ alkyl radicals and benzyl, each $R^3$, $R^4$ and $R^5$ are independently chosen from $C_{1-8}$ alkyl radicals, wherein no filtration or washing steps are performed during or after the formation of the catalyst.

Another embodiment described herein provides a procatalyst product prepared by the processes described herein.

Diorganomagnesium

Diorganomagnesium compounds are well known and are commercially available. Diorganomagnesium compounds may be generally represented by the formula $MgR_2$ wherein each R is chosen from the $C_{2-8}$ hydrocarbyl groups. In one embodiment each R is independently chosen from linear $C_{2-8}$ alkyl groups including, but not limited to, ethyl, butyl, hexyl and octyl groups. In another embodiment each R is independently chosen from $C_{2-4}$ alkyl groups. In another embodiment each R is independently chosen from ethyl and butyl groups. In one embodiment $MgR_2$ is chosen from butylethyl magnesium (BEM), dibutyl magnesium, and butyloctyl magnesium (BOM). In another embodiment $MgR_2$ is butylethyl magnesium (BEM).

Diorganomagnesium solutions are commercially available materials sold by Albemarle. Other diorganomagnesium compounds include hydrocarbon solutions of butyl ethyl magnesium or dibutyl magnesium (which may optionally be treated with an organoaluminum compound to improve solubility and/or reduce solution viscosity).

In one embodiment the $MgR_2$ is provided in a solvent chosen from $C_{5-12}$ alkanes. In one embodiment the solvent is chosen from hexane, cyclohexane, decane, heptane, isohexane, and dodecane, and mixtures thereof. In one embodiment the solvent is isohexane. In one embodiment the solvent is decane. In one embodiment the solvent is heptane.

Chlorine Amount and Chlorine Source

The use of magnesium dichloride in "magnesium-titanium" polymerization catalysts is well known. The $MgCl_2$ is generally regarded as a support for the titanium species.

The reaction of a diorganomagnesium compound with two mole equivalents of chlorine to produce magnesium dichloride is a well-known method to prepare catalyst supports.

Embodiments herein use a magnesium dichloride support that is prepared by the reaction of diorganomagnesium compound (described above) with 2 to 3 mole equivalents of chlorine.

In one embodiment, the chlorine/magnesium ratio in the support is from about 2.15 to about 3.0 per mole of magnesium (based on the amount of magnesium in the starting diorganomagnesium compound), or from about 2.15 to about 2.5.

In some embodiments, the source of chlorine reacts spontaneously with the diorganomagnesium and is a reactive organic chloride or HCl. In one embodiment the reactive organic chloride is a $C_{4-10}$ tertiary alkyl chloride. In one embodiment the reactive organic chloride is tertiary butyl chloride. In one embodiment the source of chlorine is HCl.

Reaction temperatures may range from about 20° C. to about 160° C., or from about 40° C. to about 100° C. or from about 50° C. to 90° C. or from about 40° C. to about 90° C.

The $MgCl_2$ species prepared as disclosed herein is in the delta form is known by those skilled in the art to be a highly disordered mixture of alpha and beta forms of $MgCl_2$. XRD spectroscopy is particularly useful in determining the structure of the $MgCl_2$ support characterized by an X-ray spectrum typical of a structure characterized by rototranslational disorder (see for example G. Natta et al. *J. Polym. Sci.* 1961, 51, 399-410).

In embodiments described herein, an advantage of the processes used to prepare the $MgCl_2$ species allow for the next steps of the procatalyst formation to follow without the need for intervening washing steps if that is desired. The deleterious effects of residual diorganomagnesium starting material are minimized by adjusting mole ratios of Cl to Mg or by treatment of the $MgCl_2$ slurry with an additional chlorine source, for example isobutyl aluminum dichloride (IBADC).

In some embodiments, the Cl/Mg mole ratio is about 2.2.

In embodiments described herein, the process provided is a filter-free process for preparing the procatalyst. In some embodiments filter-free processes have the advantage of providing a faster synthetic process, the use of less solvent, the production of less waste, the elimination of equipment needed for the filtration processes, the facilitation of use of less expensive catalysts, or the facilitation of the use of self-manufactured catalysts, or any combination of these advantages.

Titanium IV Source

The procatalyst described herein is then prepared by depositing a titanium compound on the above described magnesium chloride support. The starting titanium (IV) compound may be chosen from compounds of the formula $TiR^2X_3$, $Ti(OR^3)X_3$, $TiX_4$, and mixtures thereof, wherein each $R^2$ is chosen from $C_{1-8}$ alkyl and benzyl, and $R^3$ is chosen from $C_{1-8}$ alkyl and each X is independently a halogen.

In some embodiments the halogen is chosen from chlorine and bromine. In other embodiments the halogen is chlorine. In some embodiments $R^3$ is chosen from $C_{1-4}$ alkyl. In other embodiments $R^3$ is chosen from ethyl, isopropyl, and t-butyl.

In some embodiments $R^2$ is chosen from $C_{1-4}$ alkyl. In other embodiments, $R^2$ is chosen from ethyl and isobutyl. In some embodiments $R^2$ is benzyl. In some embodiments, the tetravalent titanium compound is $Ti(OCH_2CH_3)Cl_3$, or $Ti(CH_2CH_3)Cl_3$. In some embodiments, the tetravalent titanium compound is chosen from $TiCl_2Br_2$ and $TiCl_4$. In some embodiments, the tetravalent titanium compound is $TiCl_{14}$.

It will be understood by those skilled in the art that the $TiR^2X_3$, $Ti(OR^3)X_3$, $TiX_4$ species may be purchased or alternatively may be prepared by well-known reactions with commercially available and inexpensive alkyl titanium and alkoxy titanium compounds, such as $Ti(R^2)_2X_2$, $Ti(R^2)_3X_1$, $Ti(OR^3)_2X_2$, or $Ti(OR^3)_3X_1$, where each X, $R^2$ and $R^3$ are as described herein above.

The Aluminum Species

The aluminum compounds used in the methods described herein are purchased commercially from companies such as Albemarle, Sigma-Aldrich, or Fisher Chemical.

The $R^4{}_yAlOR^5{}_{3-y}$ is used to reduce the titanium species to the desired oxidation state and/or may react with excess halide. In addition, this compound may act as an activator for the polymerization reactions disclosed herein below.

The $R^1{}_xAlX_{3-x}$ described above can be used in addition to the $R^4{}_yAlOR^5{}_{3-y}$ species as a reducing agent. Other reduction agents include $AlR^*{}_3$, $AlR^*{}_2X$, to $AlR^*{}_1X_2$, where $R^*$ is $C_{2-8}$ alkyl groups. While $R^*$ may be higher alkyl groups, such aluminum species are not as commercially desirable. In some embodiments of the process of making the procatalysts described herein $R^1{}_xAlX_{3-x}$ is triisobutyl aluminum.

In some embodiments y is 2. In some embodiments y is 1.

In some embodiments each $R^4$ and $R^5$ are independently chosen from $C_{1-4}$ alkyl. In other embodiments each $R^4$ and $R^5$ is ethyl.

In one embodiment of the process of making the procatalysts described herein $R^4_y AlOR^5_{3-y}$ is diethylaluminumethoxide (DEAL-E).

In some embodiments, the titanium species is added after a smaller amount of the $R^1_x AlX_{3-x}$ compound (as compared to the amount of $R^1_x AlX_{3-x}$ compound used in embodiments disclosed in U.S. Pat. No. 9,481,748. The reduction to the $Ti^{3+}$ species is completed by the addition of the $R^4_y AlOR^5_{3-y}$ compound. In some embodiments the Al/Ti molar ratio is from about 1 to about 1.8 when measuring Al supplied from $R^1_x AlX_{3-x}$. In other embodiments the Al/Ti molar ratio is about 1 when measuring Al supplied from $R^1_x AlX_{3-x}$. In some embodiments the Al/Ti molar ratio is from about 0.7 to about 1.7, or from about 1.5 to 1.7, when measuring Al supplied from $R^4_y AlOR^5_{3-y}$. In other embodiments of this pathway, the Al/Ti molar ratio is about 1.67 when measuring Al supplied from $R^4_y AlOR^5_{3-y}$.

In either pathway discussed the reaction may be carried out at a temperature between about 40° C. and 90° C., or about 40° C. and about 70° C., or between about 45° C. and about 55° C. or at a temperature of about 50° C.

Electron Donors

The use of electron donors is well known in the art of magnesium-titanium based olefin polymerization catalysts, and may optionally be used herein. However, in some embodiments, it may be preferred not to use an electron donor when the catalyst is used under solution polymerization conditions. Suitable electron donors are well known to those skilled in the art and include tetrahydrofuran (THF), dimethyl formamide, ethyl acetate, methyl isobutyl ketone and various phthalates.

Activators

Any "activator" which activates the above described magnesium/titanium procatalyst for olefin polymerization may be employed in the present disclosure.

Exemplary activators include aluminoxanes and organoaluminum cocatalyst.

The aluminoxane may be of the formula:

$$(R^6)_2 AlO(R^6 AlO)_m Al(R^6)_2$$

wherein each $R^6$ is independently chosen from $C_{1-20}$ hydrocarbyl radicals and m is from 0 to 50, $R^6$ is a $C_{1-4}$ alkyl radical and m is from 5 to 30. In some embodiments, methylaluminoxane (or "MAO") in which each $R^6$ is methyl is the aluminoxane.

Aluminoxanes are well known as cocatalysts, particularly for metallocene-type catalysts. Aluminoxanes are also readily available articles of commerce.

The use of an aluminoxane cocatalyst generally requires a mole ratio of aluminum to the transition metal in the catalyst from 25:1 to 1000:1. Example ratios useful in the methods disclosed herein are from 5:1 to 10:1.

Example organoaluminum compounds include triethyl aluminum, triisobutyl aluminum and diethyl-aluminum ethoxide. When using these organoaluminum activators, exemplary Al/Ti ratios are from 0.5/1 to 10/1, based on the moles of Ti in the procatalyst. Solution polymerization processes may be conducted with a comparatively low Al/Ti mole ratio (for example, 0.5/1 to 5/1, especially 1/1 to 3/1) while gas phase polymerizations may be conducted with comparatively high Al/Ti mole ratios (for example 20/1 to 150/1).

In another embodiment, disclosed herein is solution olefin polymerization process comprising i) adding to one or more continuous stirred tank reactor (CSTR), optionally followed by a tubular reactor, either in series or parallel, a solvent chosen from $C_{5-12}$ alkanes, or mixtures thereof, and a procatalyst for polymerization on a delta form $MgCl_2$ support comprising a $Ti^{3+}$ complex of the formula $TiCl_3*[[R^4]_a[R^5O]_b AlX_{3-c}]_d$ wherein a is 0 to 1; b is 0 to 1; c=a+b; d is from 0.33 to 1.0; each $R^4$ and $R^5$ is independently chosen from $C_{1-8}$ alkyl radicals; each X is independently chosen from the halogen radicals; wherein at least 60% of the total Ti present is in the $Ti^{3+}$ oxidation state; and further wherein no filtration or washing step is performed on the as formed procatalyst prior to the remaining steps; ii) adding ethylene, hydrogen and optionally one or more comonomers chosen from $C_{3-8}$ comonomers to the reactor; and iii) adding an aluminum alkyl activator to the reactor in a molar ratio of about 1 to about 10 relative to the amount of procatalyst.

Solution processes for the polymerization and copolymerization of ethylene are well known in the art. These processes are conducted in the presence of an inert hydrocarbon solvent typically a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional slurry or solution process is from about 80 to about 300° C. (for example, from about 80 to about 120° C. for slurry polymerization and from about 120 to about 250° C. for solution polymerizations). However, as is illustrated in the Examples, the polymerization temperature for the solution process disclosed herein can be above 160° C. The upper temperature limit will be influenced by considerations which are well known to those skilled in the art, such as a desire to maximize operating temperature to reduce solution viscosity, while still maintaining good polymer properties. Increased polymerization temperatures generally reduce the molecular weight of the polymer. In other embodiments, the polymerization temperature can be between about 200 and about 300° C., or about 220 to about 250° C.

One example of a reaction process is a "medium pressure process," meaning that the pressure in the reactor is, for example, less than about 6,000 psi (about 42,000 kiloPascals or kPa). Pressures can range from about 10,000 to about 40,000 kPa, or from about 2,000 to about 3,000 psi (about 14,000-about 22,000 kPa), or from 725 to about 3,000 psi (about 5,000-about 22,000 kPa).

Suitable monomers for copolymerization with ethylene include $C_{3-20}$ mono- and di-olefins. Example comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents chosen from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

Co- and ter-polymers of ethylene, and one or more copolymerizable monomers can also be prepared using the methods described herein. In one embodiment such polymers will contain about 50 to about 75 weight % ethylene, for example, about 50 to 60 weight % ethylene and correspondingly from 50 to 40 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Non limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

In another embodiment the resulting polymer may comprise not less than about 80, or not less than about 90 weight % of ethylene and up to about 20, or less than 10 weight % of one or more copolymerizable monomers. In some embodiments the comonomers are $C_{3-8}$ alpha olefins such as 1-butene, 1-hexene and 1-octene.

The monomers are dissolved/dispersed in the solvent either prior to being fed to the reactor (or for gaseous monomers the monomer may be fed to the reactor so that it will dissolve in the reaction mixture). Prior to mixing, the solvent and monomers may be purified to remove potential catalyst poisons such as water, oxygen and other polar impurities. The feedstock purification follows standard practices in the art, e.g. molecular sieves, alumina beds and oxygen removal catalysts are used for the purification of monomers. In some embodiments, the solvent itself (e.g. methyl pentane, cyclohexane, hexane or toluene) may be treated in a similar manner.

The feedstock may be heated or cooled prior to feeding to the reactor.

In some embodiments, the catalyst components may be premixed in the solvent for the reaction or fed as separate streams to the reactor. In some instances premixing it may be desirable to provide a reaction time for the catalyst components prior to entering the reaction.

One embodiment, described herein provides a solution olefin polymerization process comprising i) preparing a procatalyst using the processes described herein above; ii) adding the procatalyst with a solvent chosen from $C_{5-12}$ alkanes to one or more reactors in series or in parallel configuration together with ethylene and optionally one or more comonomers chosen from $C_{3-8}$ comonomers, hydrogen to a reactor; and iii) adding an aluminum alkyl activator to the reactor in a molar ratio of about 1 to about 10 relative to the amount of procatalyst.

The polymerization processes may also use an aluminum alkyl activator chosen from $R^4{}_y AlOR^5{}_{3-y}$, trialkyl aluminum compounds and MAO.

In some embodiments the solvent used in the polymerization processes is chosen from hexane, cyclohexane, decane, heptane, isohexane, and dodecane. In other embodiments the solvent is isohexane. In other embodiments the solvent is decane.

In some embodiments a solution process is performed in a single continuous stirred tank reactor (CSTR) and optionally with one or more additional reactors. In other embodiments a solution process is performed in a dual reactor continuous reactor set up in series or parallel.

The process herein can also include the use of a tubular reactor that is connected to the discharge of the at least one CSTR. (For clarity, if two CSTR's are used in series, then the tubular reactor receives the discharge from the second CSTR).

The term "tubular reactor" is meant to convey its conventional meaning—namely a simple tube. The tubular reactor may have a length/diameter (L/D) ratio of at least 10/1. The tubular reactor is not agitated and is operated adiabatically. Thus, as polymerization progresses, the remaining comonomer is increasingly consumed and the temperature of the solution increases (both of which improve the efficiency of separating the remaining comonomer from the polymer solution). The temperature increase along the length of the tubular reactor may be greater than 3° C. (i.e. that the discharge temperature from the tubular reactor is at least 3° C. greater than the discharge temperature from the CSTR that feeds the tubular reactor).

The tubular reactor may have a feed port for additional ethylene and solvent. The feed is "tempered"—i.e. the temperature of the additional ethylene and/or solvent is heated to above ambient (or to about 100° C.) but the temperature is below the discharge temperature of the tubular reactor. In one embodiment, the ethylene is tempered to between about 80° C. to about 200° C. or between about 100° C. and about 200° C. In one embodiment the ethylene is added with solvent. The amount of solvent (expressed as a weight ratio, based on ethylene) is from about 20/1 to about 0.1/1, or from about 10/1 to about 1/1.

Optionally, the tubular reactor may also have feed ports for additional catalyst, cocatalyst, comonomer and/or telomerization agent (such as hydrogen). However, in some embodiments, no additional catalyst is added to the tubular reactor.

The total volume of the tubular reactor may be at least 10 volume % of the volume of the at least one CSTR, or from about 30% to about 200% (for clarity, if the volume of the CSTR is about 1000 liters, then the volume of the tubular reactor is at least about 100 liters, or from about 300 to about 2000 liters).

The total amount of ethylene added to the tubular reactor may be from 1 to 50 weight % of the total ethylene added to the CSTR(s). For example, if one CSTR is being operated with an ethylene flow rate of about 1000 kg/hr, then the ethylene flow to the tubular reactor would be from about 10 to about 500 kg/hr. Similarly, if two CSTR(s) were being operated with an ethylene flow of about 1000 kg/hr to the first and about 500 kg/hr to the second, then the flow of ethylene to the tubular reactor would be from about 15 to about 750 kg/hr.

In some embodiments the procatalyst is pre-formulated and added directly to the reactor.

In some embodiments the polymerization temperature is at least about 220° C., or at least about 230° C., or at least about 240° C.

In some embodiments the polymerization process using the procatalysts described herein results in a polymer having the same density but where the process uses at least about 10% less comonomer feed compared to a polymerization process using a procatalyst disclosed in U.S. Pat. No. 5,589,555.

In other embodiments the polymerization process using the procatalysts described herein results in a polymer with the same density but with a higher Mw at any polymerization temperature than the Mw obtained for a polymer prepared using a procatalyst disclosed in U.S. Pat. No. 5,589,555.

In some embodiments the reactor hold-up time is from about 30 seconds to about 1 hour. In other embodiments the reactor hold-up time is from about 30 seconds to about 30 minutes. In other embodiments the reactor hold-up time is from about 30 seconds to about 5 minutes. In other embodiments the reactor hold-up time is from about 1 minute to about 5 minutes.

Another embodiment provides a polyethylene polymer or copolymer having a density from about 0.910 g/cc to about 0.935 g/cc. Another embodiment provides a CDBI$_{50}$ octene greater than or equal to about 50. Another embodiment provides a polymer with a MWD from about 3 to about 8. Yet another embodiment provides substantially flat comonomer distribution within the final polymer product. Substantially flat comonomer distribution means that a plot of the branch content as a function of molecular weight as plotted on a GPC curve would give a line that is not more than about 15° off horizontal.

In some embodiments the polymer has less than about 10 ppm calculated residual titanium in the resulting polymer. In other embodiments the polymer has less than about 8 ppm calculated residual titanium in the resulting polymer. In other embodiments the polymer has less than about 3 ppm calculated residual titanium in the resulting polymer.

In some embodiments the polymer has less than about 120 ppm calculated residual halogen in the resulting polymer. In other embodiments the polymer has less than about 100 ppm calculated residual halogen in the resulting polymer. In other embodiments the polymer has less than about 60 ppm calculated residual halogen in the resulting polymer.

Another embodiment provides a polymer as described herein above for use in fabrication methods chosen from extrusion, injection molding, thermoforming, and rotational molding.

Another embodiment provides a polymer as described herein above for use in plastic articles such as films, fibers, molded or thermoformed articles such as drums and agricultural spray tanks, and pipe coatings.

The present invention will further be described by reference to the following examples. The following examples are merely illustrative and are not intended to be limiting. Unless otherwise indicated, all percentages are by weight.

EXAMPLES

Chemicals and Reagents

Purchased cyclohexane was dried and deoxygenated by passing it through a bed of deoxygenation catalyst (brand name R311 from BASF), an alumina bed (brand name Selexsorb COS/CD), and a molesieve (3A/13X) bed.

Methyl pentane was purchased from Imperial oil. The solvent was dried by passing it through a bed of containing Selectsorb CD and Selectsorb CDX.

20 wt % Butylethyl Magnesium (BEM) in heptane solution was purchased from Albemarle.

Isobutylaluminumdichloride (IBADC) was purchased from Sigma Aldrich with 97% by weight. It was contained in a pyrosafe and stored in a glovebox. IBADC has a boiling point of 242° C. and a density of 1.12 g/mL.

25.4 wt % Diethylaluminum Ethoxide (DEAO) in heptane solution was purchased from Akzo Nobel. DEAO has a boiling point of 98° C. and a density of 0.684 g/mL.

A drying reagent with a "built in" dryness indicator (Drierite™) was purchased from Aldrich. The drying reagent was conditioned before use by drying it at 130° C. overnight followed by a secondary overnight drying step at 220° C. in a vacuum oven.

2-chloro-2-methylpropane (tert-butyl chloride or tBuCl) was purchased from Aldrich. The tBuCl was dried by placing it over the pre-dried drying reagent under an inert environment for approximately 16 hours at a ratio of 30 g of dryness indicator per 100 mL of tBuCl. The flask containing the tBuCl was covered in foil to shield it from light during this process to minimize the formation of isobutylene. The dried tBuCl was further purified by vacuum transfer. The tBuCl moisture content was 12 ppm or less and had purity above 97% after purification. All glassware used in this procedure was dried in a 120° C. oven overnight.

Ethylene was purchased from Praxair as polymer grade. The ethylene was purified and dried by passing the gas through a series of purification beds including alumina (brand: Selexsorb COS), molesieve (type: 13X), and a deoxygenation bed (brand: Oxiclear®).

Purchased 1-octene was dried by storing a 1-liter batch over molesieve 3A.

Titanium (IV) chloride (TiCl$_4$) was purchased from Aldrich as 99.9% purity packaged under nitrogen.

Methanol was purchased as GR ACS grade from EMD Chemicals.

Analytical Methods

Melt index ("MI") measurements are conducted according to ASTM method D-1238.

Polymer densities are measured using ASTM D-1928.

Catalyst Synthesis

Catalyst Synthesis Unit (CSU):

The CSU consists of two continuously stirred tank reactors (CSTR1, a 450 mL stainless steel Parr 4560-Series reactor, and CSTR2, a 2000 mL stainless steel Parr 4520-series reactor) as well as a plug flow reactor (PFR). The stir tank reactors were designed to hold pressures up to 20.6 MPa and temperatures up to 350° C., while the PFR can hold 60 mL with a design pressure up to 20.6 MPa and design temperature up to 204° C. MgCl$_2$ can be made in the PFR through the controlled addition of BEM and tBuCl solutions with the MgCl$_2$ being collected in CSTR2, mimicking the lab-scale one-shot addition method for MgCl$_2$ synthesis. Alternatively, MgCl$_2$ can be made directly in CSTR2 mimicking a simultaneous addition method. It was observed that the use of the PFR for magnesium chloride formation provided better mixing of the reactants as well as a more controlled addition which helped to form the desired δ-MgCl$_2$ as well as assist with heat mitigation. Both the PFR method and the CSTR2 method have been used to successfully make active Ziegler-Natta catalysts. Catalyst A was made using the PFR method.

When following the PFR MgCl$_2$ formation method, the PFR was pressurized to 700 KPa before BEM and tBuCl were fast flowed into the set-up. Flow and time were then adjusted to achieve a steady operation over the course of 25 minutes. CSTR2 was pressurized to 700 KPa with nitrogen. Temperature control was not critical at this point; however the temperature was maintained above 50° C. The MgCl$_2$ slurry produced in the PFR was collected in CSTR2 allowed to stir for about 100 mins.

After the MgCl$_2$ support was prepared, remaining reagents were directly displaced into the CSTR2 reactor tank from their respective reagent sample cylinders using nitrogen pressure (conditions as seen in table 1). The reagent cylinders were loaded in a glovebox and charged with nitrogen and then the reagents were individually injected into the reactor by opening the lower cylinder valve at the designated time. After the final reagent addition, the reactor was heated to 50° C. The reaction was allowed to stir for 60 min before the reactor contents were cooled to ~20° C. and the pressure was reduced to 70 KPa. A transfer vessel was placed on a scale under 5 psig of pressurized nitrogen. Unfiltered catalysts were directly transferred into the vessel using the product transfer flex hose. Multiply inventive catalyst A filtration free offline Ziegler catalysts were made and combined.

TABLE 1

Formulation of Catalyst A Catalysts Prepared on CSU

| Catalyst | BEM (mmol) | tBuCl (mmol) | Cl/Mg | IBADC (mmol) | TiCl$_4$ (mmol) | IBADC/Ti | Mg/Ti | DEAO (mmol) | DEAO/Ti | Isolated Catalyst Slurry (g) |
|---|---|---|---|---|---|---|---|---|---|---|
| Batch 1 | 548.8 | 1205.2 | 2.20 | 124.0 | 72.9 | 1.70 | 7.53 | 87.3 | 1.20 | 1300 |
| Batch 2 | 554.4 | 1217.7 | 2.20 | 125.8 | 72.9 | 1.73 | 7.60 | 88.3 | 1.21 | 1380 |
| Batch 3 | 548.8 | 1205.2 | 2.20 | 125.8 | 74.1 | 1.70 | 7.41 | 88.8 | 1.20 | 1350 |

Catalyst A (Batch 1, 2 and 3 combined) was diluted in cyclohexane and final catalyst vessel contains 8.430 kg of catalyst A (4.57 wt % solids in cyclohexane with 0.1199 wt % Ti).

Catalyst A Evaluation at Solution Pilot Plant

Testing of an example of the offline Ziegler Natta (Z/N) slurry catalyst (Catalyst A) at the pilot plant scale continuous polymerization facility and Catalyst B and Catalyst C as comparative examples (Catalyst B was made according to the procedure disclosed in U.S. Pat. No. 9,481,748 catalyst 2c and Catalyst C was made according to the procedure disclosed in U.S. Pat. No. 9,481,748 catalyst 9) was carried out.

The examples in Table 2 illustrate the continuous flow, solution copolymerization of ethylene and 1-octene at a medium pressure using a pilot plant reactor system and using Ziegler catalyst systems. A pilot plant reactor system consists of two reactors. The first reactor was a continuous stirred tank reactor (CSTR) with a volume of 24.0 liters. The second reactor was a tubular reactor (AFT) having a volume of 82% of the CSTR volume (19.7 liters). Catalysts were fed into the CSTR. Monomer and solvent were split between the two reactors as indicated in Table 2. An offline Ziegler Natta filtration free slurry catalyst (Catalyst A) with an activator consisting of diethyle aluminuin ethoxide (DEAO) was used in the experiments. For comparison of Catalyst A, a comparative Ziegler Natta (Z/N) catalyst systems (Catalyst B and C) were also used and described in the next session. In Table 2, Product 3 (the product produced in this reactor configuration establishes a "baseline" reactor operating conditions for a given melt index, density and stress exponent). Product 2 was made with Catalyst B with the same aluminum activator. The reactor operating conditions were adjusted to yield similar melt index, density and stress exponent as in the product 3. The same strategy was applied for inventive Catalyst A to produce Product 1.

Catalyst A or Catalyst B was pumped into the continuous flow polymerization reactor using the slurry delivering system. The slurry delivery system consisted of a slurry cylinder, agitated slurry day tank, recirculation loop, slurry catalyst metering pump and solvent diluent loop. The diluted slurry catalyst was transferred from the slurry cylinder to the slurry day tank in several charges by pressurizing/sparging the cylinder with nitrogen. Once the slurry catalyst was transferred into the slurry catalyst day tank, the agitator and recirculation pump were started to keep the catalyst slurry in suspension and constant composition. The temperature of the diluted slurry catalyst was maintained at ambient temperature. Tank pressure was maintained at 300 kPag. When the slurry catalyst was ready to be transferred to the reactor, the slurry catalyst delivery pump was started and slurry catalyst was lined up to the pump. At the discharge of the slurry catalyst delivery pump, a high flow solvent diluent was used to keep the slurry catalyst in suspension and aid in delivery the catalyst to the reactor. The diluent flowrate was maintained at 15 kg/hr. The temperature of the solvent was controlled at 25° C. The solvent and slurry catalyst were pumped into a flow transmitter and the flow was recorded. The slurry catalyst flowrate into the reactor was calculated by the difference between the diluent flowrate and combined diluent and slurry catalyst flowrate. Slurry catalyst flows (and ppm's) into the reactor are adjusted by changing the slurry catalyst delivery pump motor variable frequency drive or pump stroker.

The inline formed Z/N catalyst system (Catalyst C) consisting of titanium tetrachloride (TiCl$_4$), butyl ethyl magnesium (BEM) and tertiary butyl chloride (tBuCl), with an activator consisting of triethyl aluminum (TEAL) or diethyl aluminum ethoxide (DEAO) was used. The BEM and TEAL were provided "premixed" (20/1 Mg/Al mole ratio). All catalyst components were mixed in the methyl pentane solvent within the Catalyst Torpedo. The mixing order was BEM/TEAL and tBuCl (Section #1); followed by TiCl$_4$ (Section #2); then followed by DEAO (Section #3). The catalyst was pumped into the reactor together with the methyl pentane solvent. The catalyst flowrate had an aim set point expressed as parts per million Ti by weight and was adjusted to maintain total ethylene conversions above 80%.

A list of other abbreviations used in the Table 2 follows:

hr: hour wt %: weight percent wt/wt: weight/weight

Temp: temperature

C: degrees Celsius ppm: parts per million by weight

TABLE 2

Catalyst A, B and C and catalyst performance

| Overall | units | Catalyst A (Product 1) values | Catalyst B (Product 2) values | Catalyst C (Product 3) values |
|---|---|---|---|---|
| TSR | kg/hr | 500 | 600 | 600.1 |
| FE % in (CSTR) | wt % | 13.6 | 13.6 | 12.0 |
| FE % in AFT | wt % | 15.5 | 15.4 | 13.9 |
| R2 FT split | ratio | 80 | 80 | 80 |
| FC/FE | (wt/wt) ratio | 0.4 | 0.4 | 0.45 |
| H2 in R2 | ppm | 1 | 1 | 1 |
| H2 in AFT | ppm | 0.5 | 0.5 | 0.5 |
| R2 temperature | C. | 199.4 | 199.2 | 182.1 |
| R2 Q | % | 90 | 90 | 89.9 |
| AFT temperature | C. | 224.6 | 230.3 | 212.8 |
| Total Q FE | % | 92.5 | 91.7 | 92.2 |
| Overall polymer production rate | | 87.1 | 92.6 | 83.8 |

TABLE 2-continued

Catalyst A, B and C and catalyst performance

| Overall | units | Catalyst A (Product 1) values | Catalyst B (Product 2) values | Catalyst C (Product 3) values |
|---|---|---|---|---|
| Polymer properties | | | | |
| Density | g/cc | 0.9226 | 0.9205 | 0.9215 |
| I2 | g/10 min | 1.09 | 1.04 | 0.98 |
| S.Ex | | 1.31 | 1.32 | 1.33 |

As demonstrated in Table 2, inventive Catalyst A can operate 12° C. higher than inline formed Ziegler Catalyst C for the product with similar melt index and density. Although the catalyst A run 6° C. below catalyst B. However, filtration free Catalyst A is much easier for scaling up and commercialization. Furthermore, the inventive Catalyst A is also much cheaper to make.

What is claimed is:

1. A process to prepare an olefin polymerization procatalyst comprising a $Ti^{3+}$ complex, said process comprising:
   a) forming a delta form $MgCl_2$ species by combining
      i) a Mg compound selected from the group consisting of butylethyl magnesium (BEM), dibutyl magnesium, butyloctyl magnesium (BOM), and mixtures thereof,
      ii) a solvent, wherein the solvent is a $C_{5-12}$ alkane or mixture thereof, and
      iii) a reactive organic chloride or HCl;
      wherein a Cl/Mg mole ratio is from 2.1 to 2.3;
   b) adding to said delta form $MgCl_2$ species prepared in step a), an aluminum alkyl halide of the formula $R^1{}_xAlX_{3-x}$ first, a tetravalent titanium compound second, followed by an alkyl aluminum alkoxide of the formula $R^4{}_yAlOR^5{}_{3-y}$,
      wherein:
         an Al/Ti molar ratio is from about 0.7 to about 1, when measuring Al supplied from $R^1{}_xAlX_{3-x}$; and the Al/Ti molar ratio is from about 1 to about 2, when measuring Al supplied from $R^4{}_yAlOR^5{}_{3-y}$;
         x is 1 or 2;
         y is 1 or 2;
         each $R^1$ is a $C_{1-8}$ alkyl radical;
         the tetravalent titanium compound is selected from the group consisting of $TiR^2X_3$, $Ti(OR^3)X_3$, $TiX_4$, and mixtures thereof;
         each X is independently a halogen radical;
         each $R^2$ is independently selected from the group consisting of $C_{1-8}$ alkyl radicals and benzyl; and
         each $R^3$, $R^4$, and $R^5$ is independently a $C_{1-8}$ alkyl radical;
      wherein:
         a Mg/Ti molar ratio is from about 5 to about 10; and no filtration or washing steps are performed during or after formation of the olefin polymerization procatalyst.

2. The process of claim 1, wherein the reactive organic chloride is tertiary-butylchloride (tBuCl).

3. The process of claim 1, wherein step a) is performed at a temperature between about 20° C. and about 160° C.

4. The process of claim 1, wherein step a) or step b) is performed at a temperature between about 40° C. and about 90° C.

5. The process of claim 1, wherein the Mg compound is butylethyl magnesium (BEM).

6. The process of claim 1, wherein the Cl/Mg mole ratio is about 2.2.

7. The process of claim 1, wherein $R^1{}_xAlX_{3-x}$ is selected from the group consisting of isobutylaluminum dichloride (IBADC) and ethylaluminumdichloride.

8. The process of claim 1, wherein the tetravalent titanium compound is $TiCl_4$.

9. The process of claim 1, wherein $R^4{}_yAlOR^5{}_{3-y}$ is diethylaluminumethoxide.

10. The process of claim 1, wherein the solvent is cyclohexane.

11. A solution olefin polymerization process comprising:
   i) adding to one or more continuous stirred tank reactor (CSTR), optionally followed by a tubular reactor, either in series or parallel:
      a solvent, wherein the solvent is chosen from $C_{5-12}$ alkane or mixture thereof, and
      a procatalyst for polymerization on a delta form $MgCl_2$ support comprising a $Ti^{3+}$ complex of the formula $TiCl_3*[[R^4]_a[R^5O]_bAlX_{3-c}]_d$;
      wherein:
         a is 0 to 1;
         b is 0 to 1;
         c=a+b;
         d is from 0.33 to 1.0;
         each $R^4$ and $R^5$ is independently a $C_{1-8}$ alkyl radical;
         each X is independently a halogen radical;
         at least 60% of a total Ti present is in a $Ti^{3+}$ oxidation state; and
         no filtration or washing step is performed on the procatalyst for polymerization prior to the remaining steps;
   ii) adding ethylene, hydrogen, and optionally one or more comonomers selected from $C_{3-8}$ comonomers to the CSTR reactor; and
   iii) adding an aluminum alkyl activator to the CSTR reactor in a molar ratio of about 1 to about 10, relative to an amount of the procatalyst for polymerization.

12. The polymerization process of claim 11, wherein the aluminum alkyl activator is selected from the group consisting of diethylaluminumethoxide, trialkyl aluminum compounds, and MAO.

13. The polymerization process of claim 11, wherein the solvent is cyclohexane.

14. The polymerization process of claim 11, wherein the process is performed at a temperature of at least about 220° C.

15. The polymerization process of claim 11, wherein the CSTR reactor has a hold-up time from about 30 seconds to about 5 minutes.

* * * * *